US008392099B2

(12) United States Patent
Choi

(10) Patent No.: US 8,392,099 B2
(45) Date of Patent: Mar. 5, 2013

(54) METHOD OF PROVIDING DETAIL INFORMATION USING MULTIMEDIA BASED TRAFFIC AND TRAVEL INFORMATION MESSAGE AND TERMINAL FOR EXECUTING THE SAME

(75) Inventor: Hyun Seok Choi, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 911 days.

(21) Appl. No.: 12/252,094

(22) Filed: Oct. 15, 2008

(65) Prior Publication Data

US 2009/0105932 A1 Apr. 23, 2009

(30) Foreign Application Priority Data

Oct. 16, 2007 (KR) ........................ 10-2007-0103943

(51) Int. Cl.
*G06F 19/00* (2011.01)
*G06G 7/70* (2006.01)
*G06G 7/76* (2006.01)
*G08G 1/00* (2006.01)

(52) U.S. Cl. ..... 701/117; 701/118; 701/119; 340/995.1; 340/995.12; 340/995.13; 340/995.17; 340/995.24; 370/441; 455/456.1

(58) Field of Classification Search .................. 701/117, 701/118, 119; 340/995.1, 995.12, 995.13, 340/995.17, 995.24; 370/536, 441; 455/456.1
See application file for complete search history.

(56) References Cited

U.S. PATENT DOCUMENTS 7,840,868 B2 * 11/2010 Kim et al. ..................... 714/755
7,920,073 B2 * 4/2011 Woo et al. ................ 340/995.17
2007/0167172 A1 * 7/2007 Kim et al. .................. 455/456.1
2008/0074290 A1 * 3/2008 Woo et al. ..................... 340/934
2009/0125219 A1 * 5/2009 Lee et al. ...................... 701/118
2010/0257435 A1 * 10/2010 Kim et al. ..................... 714/795

OTHER PUBLICATIONS

Cho et al., System and Services of Terrestrial Digital Multimedia Broadcasting (T-DMB), Mar. 2007, IEEE Transactions on Broadcasting, vol. 53, No. 1, pp. 171-178.*
Jeong et al., A novel TPEG application for location based service using terrestrial-DMB, Feb. 2006, IEEE Transactions on Consumer Electronics, pp. 281-286.*
Geon et al., Design and Implementation of T-DMB Receiver for Offering Traffic and Traveler Information, Sep. 2006, IEEE 64$^{th}$ Vehicular Technology Conference, VIC-2006, pp. 1-4.*
Cho et al., Real Time Traffic Information Service Using Terrestrial Digital Multimedia Broadcasting System, Dec. 2006, IEEE Transactions on Broadcasting, vol. 52, No. 4, pp. 550-556.*

* cited by examiner

*Primary Examiner* — Khoi Tran
*Assistant Examiner* — Jamie Figueroa
(74) *Attorney, Agent, or Firm* — Birch, Stewart, Kolasch & Birch, LLP

(57) ABSTRACT

There is disclosed a method of providing detailed information using a multimedia based traffic and travel information message and a terminal for executing the same. A method of providing detailed information using a multimedia based traffic in accordance with this document may comprise receiving transport protocol expert group (TPEG) information, comprising a road traffic message and a multimedia based traffic and travel information message and comprised of a hierarchical structure, displaying one or more events comprised in the road traffic message, allowing a request for detailed information about any one of the events to be input, and receiving detailed information of a multimedia type from a multimedia data providing server through specific one of bearer information comprised in the multimedia based traffic and travel information message and providing the received detailed information.

22 Claims, 12 Drawing Sheets

FIG. 3
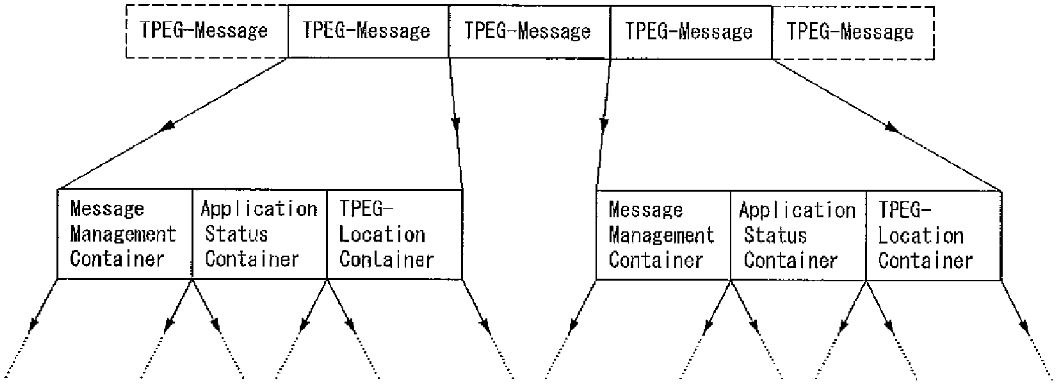
FIG. 4
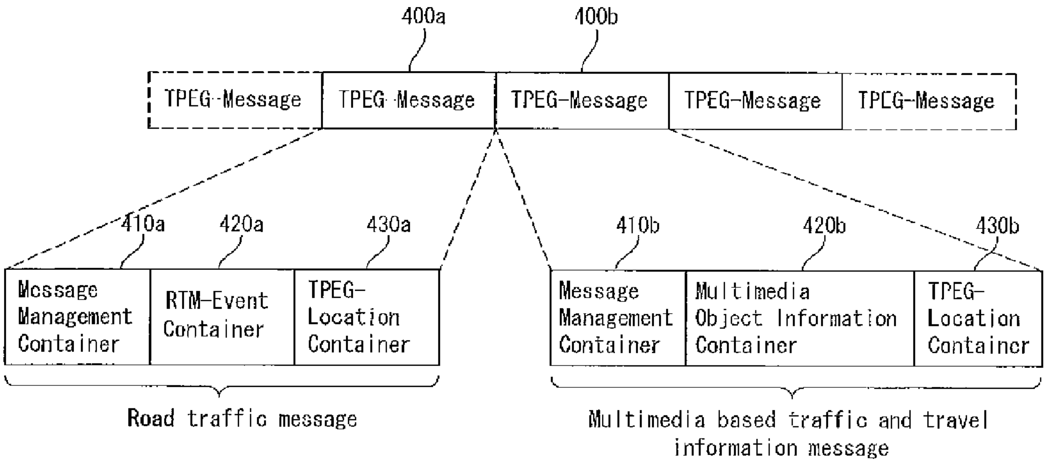
FIG. 5A
| | |
|---|---|
| <mbt_component(80)>:= | : Object information |
| <intunti>(id), | : Identifier, id=80 hex |
| <intunti>(n), | : Component data length (n) of byte unit |
| m*<object_component()>; | : Status component |

FIG. 5B

| | |
|---|---|
| <object_component(00)>:= | :Play type |
| <intunti>(id), | : Identifier, id=00 hex |
| <intunti>(n), | : Component data length (n) of byte unit |
| <mbt01>; | : Play format |

FIG. 5C

| | |
|---|---|
| <object_component(01)>:= | : Object type |
| <intunti>(id), | : Identifier, id=01 hex |
| <intunti>(n), | : Component data length (n) of byte unit |
| m*<object_format_component()>; | : Status component |

FIG. 5D

| | |
|---|---|
| <object_component(02)>:= | : Object size |
| <intunti>(id), | : Identifier, id=02 hex |
| <intunti>(n), | : Component data length (n) of byte unit |
| <intunlo>; | : Object size (byte unit, 0-4,294,967,296 byte) |

FIG. 5E

| | |
|---|---|
| <object_component(03)>:= | : Compression information |
| <intunti>(id), | : Identifier, id=02 hex |
| <intunti>(n), | : Component data length (n) of byte unit |
| <mbt05>; | : Compression information |

FIG. 6A

| | |
|---|---|
| <object_format_component(00)>; | : Object format video component |
| <intunti>(id), | : Identifier, id=00 hex |
| <intunti>(n), | : Component data length (n) of byte unit |
| <mbt02>; | : Video object format |

FIG. 6B

| | |
|---|---|
| <object_format_component(01)>; | : Object format audio component |
| <intunti>(id), | : Identifier, id=01 hex |
| <intunti>(n), | : Component data length (n) of byte unit |
| <mbt03>; | : Audio object format |

FIG. 6C

| | |
|---|---|
| <object_format_component(02)>; | : Object format image component |
| <intunti>(id), | : Identifier, id=01 hex |
| <intunti>(n), | : Component data length (n) of byte unit |
| <mbt04>; | : Image object format |

FIG. 7A

| | |
|---|---|
| <mbt_component(81)>:= | : Information type |
| <intunti>(id), | : Identifier, id=81 hex |
| <intunti>(n), | : Component data length (n) of byte unit |
| m*<application_information_component()>; | : Information type component |

FIG. 7B

| | |
|---|---|
| <application_information_component(00)>;= | : Information type component template |
| <intunti>(id), | : Identifier, id=x |
| <intunti>(n), | : Component data length (n) of byte unit |
| <mbt06>; | : Information type |

FIG. 7C

| | |
|---|---|
| <application_information_component(01)>;= | : Collection source component |
| <intunti>(id), | : Identifier, id=01 hex |
| <intunti>(n), | : Component data length (n) of byte unit |
| <mbt07>; | : Collection source |

FIG. 7D

| | |
|---|---|
| <application_information_component(02)>:= | : Contents description component |
| <intunti>(id), | : Identifier, id=02 hex |
| <intunti>(n), | : Component data length (n) of byte unit |
| <mbt07>; | : Language code |
| <short_string>; | : Contents description |

FIG. 7E

| | |
|---|---|
| <application_information_component(03)>:= | : Billing information |
| <intunti>(id), | : Identifier, id=03 hex |
| <intunti>(n), | : Component data length (n) of byte unit |
| m*<billing_information_component()>; | : Billing information |

FIG. 8A

| | |
|---|---|
| <mbt component(82)>:= | : Bearer |
| <intunti>(id), | : Identifier, id=80 hex |
| <intunti>(n), | : Component data length (n) of byte unit |
| m*<bearer_information_component()>; | : Bearer component |

FIG. 8B

| | |
|---|---|
| <bearer information component(00)>:= | : DMB component |
| <intunti>(id), | : Identifier, id=00 hex |
| <intunti>(n), | : Component data length (n) of byte unit |
| <intunti>, | : Extension country code (ECC) |
| <intunti>, | : Ensemble Identifier(EID) |
| <dmb_frequency>, | : Frequency information |
| m*<dmb_information_component()>; | |

FIG. 8C

| | |
|---|---|
| <bearer_information_component(01)>:= | : Internet component |
| <intunti>(id), | : Identifier, id=01 hex |
| <intunli>(n), | : Component data length (n) of byte unit |
| <long_string>; | : URL defined in RFC1738 |

FIG. 8D

| | |
|---|---|
| <bearer_information_component(02)>:= | : CDMA component |
| <intunti>(id), | : Identifier, id=02 hex |
| <intunli>(n), | : Component data length (n) of byte unit |
| <long_string>; | : URL defined in RFC1738 |

FIG. 8E

| | |
|---|---|
| <bearer_information_component(03)>:= | : Internet component |
| <intunti>(id), | : Identifier, id=03 hex |
| <intunli>(n), | : Component data length (n) of byte unit |
| <long_string>; | : URL defined in RFC1738 |

FIG. 9

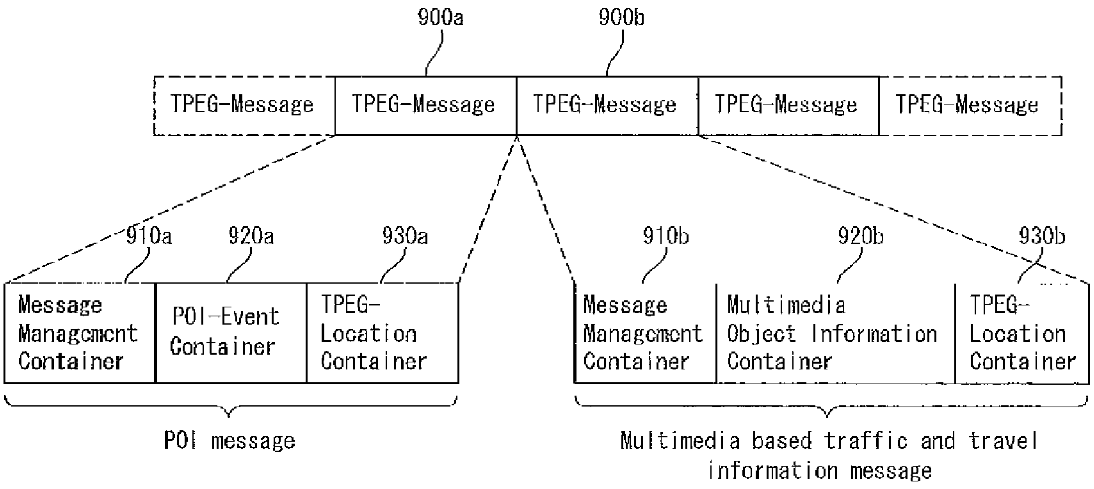

METHOD OF PROVIDING DETAIL INFORMATION USING MULTIMEDIA BASED TRAFFIC AND TRAVEL INFORMATION MESSAGE AND TERMINAL FOR EXECUTING THE SAME

This nonprovisional application claims priority under 35 U.S.C. §119(a) on Patent Application No. 10-2007-0103943 filed in Republic of Korea on Oct. 16, 2007 the entire contents of which are hereby incorporated by reference.

BACKGROUND

1. Field

This document relates to a method of providing detailed information using a multimedia based traffic and travel information message and a terminal for executing the same.

2. Related Art

Transport protocol expert group (TPEG) is services for transmitting traffic and travel information through digital broadcasting media, such as digital multimedia broadcasting (DMB), and contains various specifications, comprising coding, decoding, and filtering of data.

SUMMARY

An aspect of this document is to provide a method of providing detailed information using a multimedia based traffic and travel information message, in which detailed information requested by a user is provided in the multimedia data format.

In an aspect, a method of providing detailed information using a multimedia based traffic and travel information message may comprise receiving transport protocol expert group (TPEG) information, comprising a road traffic message and a multimedia based traffic and travel information message and comprised of a hierarchical structure, displaying one or more events comprised in the road traffic message, allowing a request for detailed information about any one of the events to be input, and receiving detailed information of a multimedia type from a multimedia data providing server through specific one of bearer information comprised in the multimedia based traffic and travel information message and providing the received detailed information.

In another aspect, a method of providing detailed information using a multimedia based traffic and travel information message may comprise receiving TPEG information, comprising a point of interest (POI) message and a multimedia based traffic and travel information message and comprised of a hierarchical structure, displaying one or more POIs comprised in the POI message, allowing a request for detailed information about any one of the POIs to be input, and receiving detailed information of a multimedia type from a multimedia data providing server through specific one of bearer information comprised in the multimedia based traffic and travel information message and providing the received detailed information.

In still another aspect, a terminal may comprise a communication module configured to perform communication with a multimedia data providing server, a broadcasting signal receiver configured to receive TPEG information, comprising at least one of a road traffic message and a POI message, and a multimedia based traffic and travel information message and comprised of a hierarchical structure, a display configured to display one or more events comprised in the road traffic message or one or more POIs comprised in the POI message, an input unit configured to receive a request for detailed information about any one of the events or any one of the POIs, and a controller configured to control the communication module to receive detailed information of a multimedia type from the multimedia data providing server through specific one selected from pieces of bearer information, which are comprised in the multimedia based traffic and travel information message, when the request for the detailed information is made.

BRIEF DESCRIPTION OF THE DRAWINGS

The implementations of this document will be described in detail with reference to the following drawings in which like numerals refer to like elements.

FIG. 3 is a diagram showing the format of TPEG information;

FIG. 4 is a diagram showing TPEG information, including a TPEG road traffic message application and a TPEG-multimedia based traffic and travel information application, in accordance with this document;

FIG. 5*a* shows the format of an object information component, and FIGS. 5*b* to 5*e* show component formats of a play type, an object type, an object size, compression information, and so on;

FIGS. 6*a* to 6*c* show the formats of a video component, an audio component, and an image component;

FIG. 7*a* shows the format of an information type component;

FIGS. 7*b* to 7*e* show an information type component format, a collection source component format, a contents description component format, and a billing information component format;

FIG. 8*a* shows the format of a bearer information component;

FIGS. 8*b* to 8*e* show the formats of digital multimedia broadcasting (DMB), Internet, global system for mobile (GSM), and code division multiple access (CDMA) components;

FIG. 9 shows TPEG information, including a point of interest (POI) service application and a TPEG-multimedia based traffic and travel information application, in accordance with another embodiment of this document;

DETAILED DESCRIPTION

Hereinafter, implementations of this document will be described in detail with reference to the attached drawings.

Figure 1:
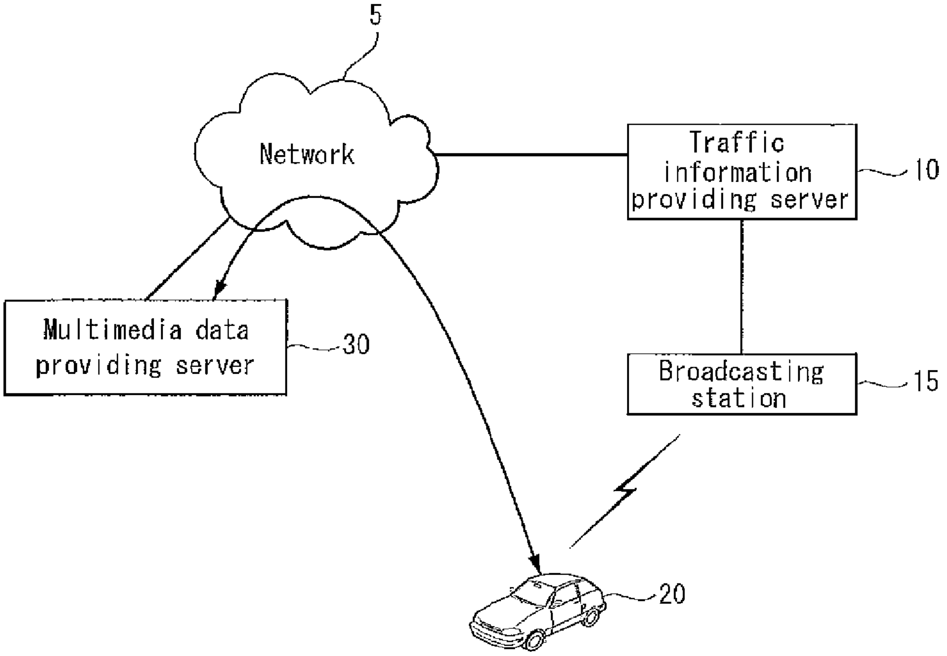
FIG. 1 is a schematic diagram showing a traffic information providing system in accordance with this document.

FIG. 1 is a schematic diagram showing a traffic information providing system in accordance with this document.

Referring to FIG. 1, a traffic information providing system comprises a network 5, a traffic information providing server 10, a broadcasting station 15, a vehicle 20, and a multimedia data providing server 30.

The network 5 comprises wired/wireless communication networks such as a local area network (LAN) and a wide area network (WAN). Various pieces of traffic information (ex: road traffic information, information about areas of interest) are collected over the network 5. Collected information is processed according to the TPEG specification in the server 10 and sent to the broadcasting station 15. The broadcasting station 15 inserts traffic information, which has been processed according to the TPEG specification, into a broadcasting signal and broadcasts the broadcasting signal to the vehicle 20.

The server 10 processes various pieces of traffic information collected via several paths connected to the network 5. For example, the paths through which traffic information is collected may comprise paths, such as the input of an operator, wired/wireless Internet, a transparent data channel (TDC), digital broadcasting service such as multimedia object transport (MOC), other servers, and probe cars. The server 10 reconfigures the collected traffic information according to a traffic information format, for example, a format according to the TPEG specification (i.e., specification for traffic information services). More specifically, in the present embodiment, the server 10 can generate traffic information as a traffic information format of the TPEG specification, comprising a TPEG-road traffic message application and a multimedia based traffic and travel information message application.

The multimedia based traffic and travel information message application is comprised in the traffic information of the TPEG specification in order to provide detailed information about specific events comprised in the TPEG-road traffic message application.

The TPEG-multimedia based traffic and travel information application can be applied to various types of TPEG terminals. The TPEG-multimedia based traffic and travel information application can be applied to global positioning system (GPS) receivers and TPEG terminals for mobile or fixed reception with no electronic map as well as electronic map based TPEG terminals and GPS TPEG terminals with no electronic map. Further, a transmitted TPEG-multimedia based traffic and travel information application further transfers detailed information, having image, video, and audio formats, to information serviced by existing applications. This is described in more detail later on.

In the present embodiment, the server 10 can generate the traffic information format of the TPEG specification, comprising a point of interest (POI) service application and a multimedia based traffic and travel information message application, and transmits the traffic information format to the broadcasting station 15. The multimedia based traffic and travel information message application is adapted to provide detailed information about a specific POI comprised in a POI service application in the same manner as described above and is comprised in the traffic information of the TPEG specification.

The POI service targets terminals in which an electronic map or a GPS receiver is not mounted or terminals having both the electronic map and the GPS receiver mounted therein and is service for delivering POI information to end users using text, voice, and graphics.

The broadcasting station 15 loads the traffic information of the TPEG specification, which is received from the server, on a broadcasting signal and transmits the broadcasting signal wirelessly such that a traffic information receiving terminal (for example, a navigation device) mounted in the vehicle 20, etc. can receive the traffic information.

Traffic information may comprise information about various traffic conditions, which are necessary for road, marine, and aviation services such as accident, road conditions, traffic congestion, road constructions, road closing, delay of public transport networks, and delay of aviation operations.

The broadcasting station 15 receives traffic information processed by the server 10 and transmits the traffic information to the vehicle 20 through a digital signal according to various digital broadcasting specifications. In this case, the broadcasting specifications may comprise a variety of digital broadcasting specifications, such as Eureka 147 [ETSI EN 300 401] based European digital audio broadcasting (DAB) specification, terrestrial or satellite DMB, terrestrial digital video broadcasting (DVB-T) specification, digital video broadcasting-handheld (DVB-H) specification, and media forward link only (MFLO) specification.

The broadcasting station 15 can transmit the traffic information over wired/wireless networks such as wired/wireless Internets.

The vehicle 20 refers to all kinds of carriers, which are implemented using mechanical and/or electronic devices for the purpose of carrying people or things, such as general passenger cars, buses, trains, crafts, and airplanes. It is to be understood that, although embodiments are described on the basis of a traffic information receiving terminal mounted in a general passenger car, this document is not limited to the embodiments.

The vehicle 20 has a traffic information receiving terminal mounted therein and is adapted to receive TPEG data of a TPEG format, which is transmitted from the broadcasting station 15, using the mounted traffic information receiving terminal, process the received data, and deliver the processed data to an end user through graphics, text and/or audio.

Figure 2:
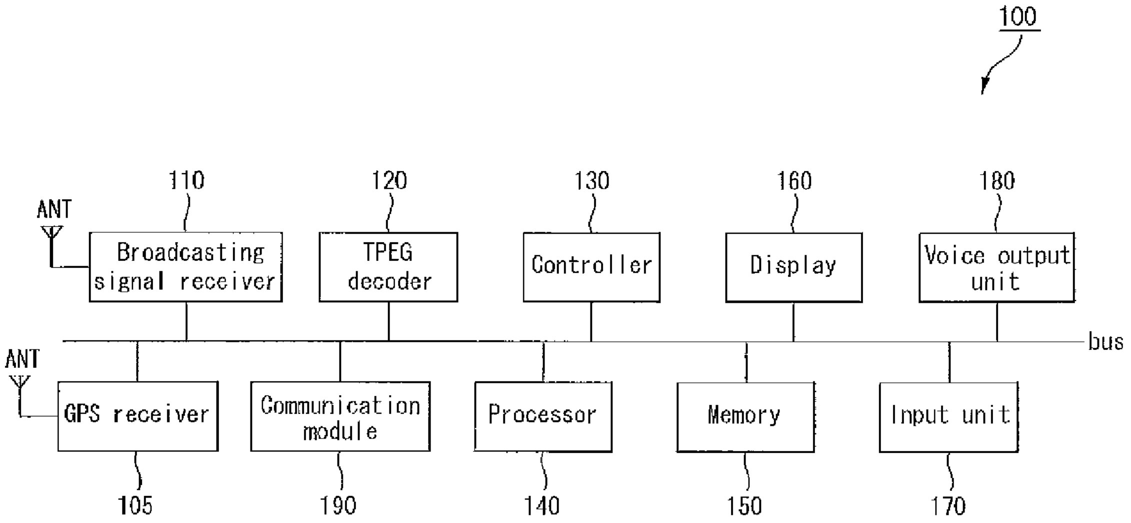
FIG. 2 is a block diagram showing the configuration of a terminal in accordance with this document.

FIG. 2 is a block diagram showing the configuration of a terminal in accordance with this document.

Referring to FIG. 2, the terminal 100 is divided into an in-dash type and an on-dash type according to an installation type in the vehicle 20. An in-dash type terminal is of a type in which the terminal is inserted into a certain space allocated within the dashboard of the vehicle 20 and fixed and mounted therein. An on-dash type terminal is of a type in which the terminal is nested on the dashboard of the vehicle 20 or installed near the dashboard using a specific support. The on-dash type terminal is attached to the vehicle 20 attachably thereto and detachably therefrom and is also called a portable navigation device.

The terminal 100 in accordance with this document comprises information terminals for both the in dash type and on dash type vehicles. Further, the terminal 10 comprises all information processing apparatuses, which can receive and/or process traffic information, such as a variety of portable terminals which can perform a navigation function while operating in conjunction with a GPS receiver within the vehicle 20.

Referring to FIG. 2, the terminal 100 of the present embodiment may comprises a GPS receiver 105, a broadcasting signal receiver 110, a TPEG decoder 120, a controller 130, a processor 140, memory 150, a display 160, an input unit 170, a voice output unit 180, and a communication module 190.

The GPS receiver 105 receives GPS data (navigation message) (i.e., position information signal), which is transmitted by a GPS satellite (not shown), through an antenna ANT. The terminal 105 can check a current location of the vehicle 20 through the GPS data.

The broadcasting signal receiver 110 receives a broadcasting signal comprising TPEG information, which is transmitted from the broadcasting station 15, through an antenna ANT. A broadcasting signal received by the broadcasting signal receiver 110 comprises video and audio data according to various specifications, such as terrestrial or satellite DMB, DAB, DVB-T, and DVB-H. The broadcasting signal also comprises traffic information according to traffic information (TPEG) services and binary format for scene (BIFS) data services, and supplementary information such as various supplementary data. The broadcasting signal receiver 110 synchronizes a signal band from which TPEG information is provided, demodulates the synchronized signal, and outputs the decoded signal to the TPEG decoder 120.

The TPEG decoder 120 decodes TPEG information from the decoded signal and provides the decoded TPEG information to the controller 130.

The controller 130 controls an overall operation of the terminal 100. The processor 140 performs processing on various data under the control of the controller 130 and outputs processed results to the display 160 or the voice output unit 180. The controller 130 and the processor 140 may be implemented as one control processing unit (CPU).

The memory 150 comprises nonvolatile memory and volatile memory. Nonvolatile memory of the memory 150 stores programs, data, etc., which are necessary to perform various functions provided by the terminal 100, and volatile memory thereof temporarily stores various data occurring according to an operation of the terminal 100. In the present embodiment, particularly, the memory 150 stores an operation program, digital map data, various icons and the like.

The display 160 is implemented using a display device such as a liquid crystal display (LCD) and displays video signals provided from the processor 140. The display 160 can be implemented using a touch screen and can be implemented to perform a display function and an input function at the same time (i.e., an input function of displaying various functions provided by the terminal 100 in a menu structure and executing a menu selected by a user through touch employing fingers, a stylus pen, etc.

The input unit 170 receives various operation commands from a user and transmits them to the controller 130. The input unit 170 can be implemented using key buttons, a remote controller, a touch pad, a touch screen or the like.

The voice output unit 180 generates an audio signal for voice advice on a selected path under the control of the controller 150, amplifies the audio signal to a predetermined level, and outputs an amplified signal through a speaker (not shown).

The communication module 190 performs communication with an external server (for example, the multimedia data providing server 30) under the control of the controller 130. In the present embodiment, the communication module 130 may comprise a module for performing communication using any one of CDMA, GSM, and Internet.

FIG. 3 is a diagram showing the format of TPEG information.

Referring to FIG. 3, TPEG information comprises a sequence of message segments (hereinafter referred to as 'TPEG message').

The message segments may be applied to different applications. For instance, each TPEG message can be applied to any one of a TPEG-Congestion and Travel-Time (CTT) information Application, a TPEG-road traffic message application, a TPEG-Public Transport Information Application, a TPEG-multimedia based traffic and travel information application, a TPEG-TTI Point-Of-Interest Information service Application, and other applications.

A unique identification number referred to as application identification (AID) is assigned to each TPEG application. The AID is used to decode a received TPEG message using the most appropriated application decoder.

The TPEG-road traffic message application is assigned an AID 0001 (hex), the TPEG CTT is assigned an AID 0010 (hex), and the TPEG multimedia based traffic and travel information application is assigned an AID 0008 (hex) and the like.

The TPEG message comprises a message management container, an application status container, and a TPEG-location container.

The application status container has different contents according to the type of a TPEG message application.

The TPEG-location container comprises location information about a link (i.e., each road section). A message, included in TPEG information and transmitted, is location-dependent, and each message comprises information about a location. A TPEG location referencing method is defined in TPEG Part 6—Location Referencing for Application. In TPEG Part 6, eight location types are defined in TPEG table loc01 in order to classify location types to be transmitted. It is necessary to employ a location referencing field smoothly and economically to the greatest extent possible since congestion and traffic information comprise information about numerous sections. Accordingly, additional components are added to a location type table. One component is a location referencing method employing a coordinate system, and the other component is a location referencing method employing a predefined node link ID.

In the case in which a coordinate system is employed, location referencing denotes a section in transmitting longitude/latitude. In this case, it is indispensable to transmit a coordinate with respect to a start point and an end point. Further, names about two coordinate sections can be transmitted in a text form, if appropriate, and a coordinate system thereof complies with WSC84 system.

As still another location referencing method, there is a method using a predefined node link ID. In this case, an identification for applying a corresponding ID is assigned.

FIG. 4 is a diagram showing TPEG information, including a TPEG-road traffic message application and a TPEG-multimedia based traffic and travel information application, in accordance with this document.

Referring to FIG. 4, a road traffic message **400*a* may comprise a message management container 410*a*, a road traffic message (RTM)-event container 420*a*, and a TPEG-location container 430*a***.

The message management container **410*a* of the road traffic message 400*a*** may comprise a message identifier (MID), a version number (VER), a date and time component, a severity factor (SEV), unverified Information (UNV), and cross-reference information (CRI). Of them, the message identifier and the version number are indispensable components.

The RTM-event container **420*a* of the road traffic message 400*a*** defines an event according to lots of steps and represents an event using a sequential coding method according to an access method of a hierarchical structure.

Table 1 lists events, belonging to a class of level 1 (i.e., the highest level), of events defined in the TPEG-road traffic message application.

TABLE 1

| Class | Description |
|---|---|
| Accident | Descriptions of situations in which road users (vehicles, animals and people) do not behave in a predictable or safe manner and either impact with each other or the roadside infrastructure and in some cases may leave the road. |
| Obstructions | Descriptions of situations in which road users (vehicles, animals and people) or other causes (man-made or environmental) make it difficult or impossible for other road users to progress along that part of roadway. |
| Activities | Descriptions of events (particularly involving people) that can have an impact on the road traffic. |
| Road conditions | Descriptions of changes to the properties of the surface of the road (disruption to the surface, adhesion reduction or changes to the road markings) that may affect the progress of the road user. |
| Network performance | Descriptions of the effect on road users (delay, flow or speed) that arise out of external events. |
| Network conditions | Descriptions of changes to network conditions planned, imposed or advised by the road network operator that affects the drivers, vehicles, and routing. |
| Facilities performance | Descriptions of the changes (for any reason) to the availability of control, assistance and roadside services. |
| Moving hazard | Descriptions of situations in which non-stationary road users (vehicles, animals and people) make it hazardous for others to use the road. |
| Security alert | Descriptions of situations which may have safety implications for the road user. |
| Public transport information | Descriptions of abnormal operation of all forms of public transport which may affect the road user's journey. |
| Visibility | Descriptions of changes to the normal obscurity or lighting conditions that may affect the road user's ability to see the road or other road users ahead. |
| Weather | Descriptions of weather situations that are affecting or may affect the progress of the road-user. |
| Diversion advice | Descriptions of alternative routes for advised via the service provider |

Referring to Table 1, events belonging to class 1 comprise accident, obstructions, activities, road conditions, network performance, network conditions, facilities performance, moving hazard, security alert, public transport information, visibility, weather, and diversion advice.

Accident indicates a collision between vehicles or a collision between a vehicle and physical facilities in a situation unexpected by a road user or general situations, and a situation in which a vehicle is deviated from a road. Obstructions indicate a situation that gives a difficulty in traveling a road due to road users (people, vehicles, animals) or other things (people or environmental problems). Activities indicate description of events that may have influence on road traffic. Road conditions indicate the state of a road surface affecting the traveling of road users (ex: bursts of a road surface, deformation of road marking)

Network performance indicates description of things, which affect road user, other than events (ex: delay, traffic flow, speed). Network status indicates description of a road network status by a road network operator with respect to things affecting drivers, vehicles, and paths. Facilities performance indicates description when signs and use of roadside facilities are changed. Moving hazard indicates description of a situation, which limits use of a road, with respect to other road users due to vehicles, animals, and people while using the road.

Security alert indicates description of a situation having a close relationship in safety for road users. Public transport information indicates description of abnormal public transport operations, which may have an influence on the travel of road users. Visibility indicates description of hindrance, which may affect a road user's eyesight in driving or a change in the state of light. Weather indicates description of weather situations, which may have an influence on a road user's driving. Diversion advice indicates description of various path advices provided by a service provider.

The TPEG-location container 430*a* of the road traffic message 400*a* comprises location information about a link (i.e., a road section), and location information about a point where an event has occurred.

Referring to FIG. 4, a multimedia based traffic and travel information message 400*b* may comprise a message management container 410*b*, a multimedia object information container 420*b*, and a TPEG-location container 430*b*.

The message management container 410*b* of the multimedia based traffic and travel information message 400*b* may comprise a message identifier, a version number, a date and time component, and CRI. The CRI refers to a reference pointer about one or several messages in the same or different TPEG services and comprises a service component identifier (SCID), a version number, and a message identifier.

The multimedia object information container 420*b* uses a sequential coding method according to a hierarchical access method in defining multimedia based traffic and travel information. This is for the purpose of enabling compatibility with coding and decoding protocols of other applications other than a major object to ensure terminal compatibility according to specification extension and component addition.

The multimedia object information container 420*b* comprises object Information, information for appropriated applications, bearer information, and additional information, which can be expressed in the following table.

TABLE 2

| Class | Description |
|---|---|
| Object information | |
| Object_Information | Describes information of object attributes, such as a play type and format of a multimedia object |
| Information for appropriated applications | |
| Application_Information | Describes whether a delivered object contains information about which application |
| Bearer information | |
| Bearer_Information | Describes information about at which bearer is which object located |
| Additional information | |
| Additional Information | Describes additional information about multimedia based traffic and travel information in a text form |

Object information describes detailed information about object attribute information, etc. of a delivered multimedia object, and a lower class is as follows.

Play type—ex) streaming, download

Object type—ex) still, video, still images, voice

Object format—ex) JPEG

Object size

Compression information

In the present embodiment, the object information comprises multimedia object attribute information about detailed information of an event comprised in the road traffic message shown in FIG. 4. In other words, the object information comprises information about through which method of the streaming and download methods is detailed information transmitted, information about to which multimedia type of still, video, still images, and voice does detailed information belongs to, and multimedia object attribute information such as the format of detailed information, the capacity of detailed information, and compression information of detailed information.

FIG. 5*a* shows the format of an object information component.

Referring to FIG. 5*a*, an object information component is assigned an identifier '80 (hex)', comprises m state components, and has a field in which the entire data length of a comprised object information component is represented by a byte unit.

Components, such as a play type, an object type, an object size, and compression information are loaded in each state component of the object information components in the formats shown in FIGS. 5*b* to 5*e*.

The play type component is assigned an identifier '00', the object type component is assigned an identifier '01', the object size component is assigned an identifier '02', and the compression information component is assigned an identifier '03'

Referring to FIG. 5*c*, the object type component comprises m object format components (ex: video, audio, and image).

FIGS. 6*a* to 6*c* show the formats of an object format_video component, an object format_audio component, and an object format_images component. Referring to FIGS. 6*a* to 6*c*, the object format_video component is assigned an identifier '00', the object format_audio component is assigned an identifier '01', and the object format_images component is assigned an identifier '02'.

The information for appropriated applications describes that a delivered object comprises information about which application and comprises the following lower classes.

Application type

Contents description

Billing information

In the present embodiment, the application type may correspond to the TPEG-road traffic message application.

FIG. 7*a* shows the format of an information type component.

Referring to FIG. 7*a*, the information for appropriated applications component is assigned an identifier '81 (hex)', comprises m information for appropriated applications components, and has a field in which the entire data length of comprised information for appropriated applications components is represented by a byte unit.

FIGS. 7*b* to 7*e* show an information type component format, a collection source component format, a contents description component format, and a billing information component format.

Referring to FIGS. 7*b* to 7*e*, the information for appropriated applications component is assigned an identifier '00', a collection source component is assigned an identifier '01', a contents description component is assigned an identifier '02', and a billing information component is assigned an identifier '03'.

The bearer information describes information about at which bearer is an object located and has the following lower classes.

Broadcasting network

Telecommunication network

FIG. 8*a* shows the format of a bearer information component. The bearer information component is assigned an identifier '82 (hex)', comprises m bearer information components, and has a field in which the entire data length of comprised bearer information components are represented by a byte unit.

Information, such as DMB, Internet, CDMA, and GSM, are loaded in the bearer information component in the formats shown in FIGS. 8*b* to 8*e*.

The DMB component is assigned an identifier '00' and comprises an extension country code, an ensemble identifier, frequency information and the like.

The Internet component is assigned an identifier '01', the CDMA component is assigned an identifier '02', and the GSM component is assigned an identifier '03'. Each of the Internet, CDMA, and GSM components comprises URL information defined in RFC 1738.

In the present embodiment, URL information may comprise the type of services to be accessed, the location of a server, which provides an event-associated multimedia file (i.e., detailed information of a multimedia type), and the location of an event associated multimedia file.

In the present embodiment, any one of DMB (i.e., a broadcasting network), and Internet, CDMA or GSM (i.e., a telecommunication network) may be used as bearer information of a multimedia object.

The additional information describes supplementary information, auxiliary information, etc., which are associated with multimedia based traffic and travel information, on a per message basis in a text form.

The TPEG-location container 430*c* of the multimedia based traffic and travel information message 430 comprises information about the location of a point at which multimedia based traffic and travel information is to be provided.

In the sequence of the TPEG message segment shown in FIG. 4, it has been shown that the road traffic message and the multimedia based traffic and travel information message are encoded according to a continuous sequence. It is however to be noted that the road traffic message and the multimedia based traffic and travel information message may not be encoded according to a continuous sequence.

FIG. 9 shows TPEG information, including a POI service application and a TPEG-multimedia based traffic and travel information application, in accordance with another embodiment of this document.

Referring to FIG. 9, the POI message 900*a* comprises a message management container 910*a*, a POI-event container 920*a*, and a TPEG-location container 930*a*.

The message management container 910*a* of the POI message 900*a* may comprise a message identifier (MID), a version number (VER), a date and time component, a severity factor (SEV), unverified information (UNV), etc.

The message identifier is an identifier about a message associated with each event in the service component. The version number refers to a sequential number for identifying messages having the same message identifier. The version number is sequentially increased one by one as information is updated from the first number VER=0 when an event is generated.

The date and time component comprises a message creation time, a start time, an end time, and a valid message time. The message creation time comprises a data and time stamp, wherein the data and time stamp records therein a date when a message is actually created and is used to manage a message. The start time refers to the time when an event enters which status. The may refer to a data when the event has already been entered or is expected to enter in the future. The end time refers to the time when an event is deviated from which state and may refer to a data that has already been deviated or is expected to deviate therefore. The valid message time refers to a date when the validity of a message is lost, that is, a date when a message is deleted.

The severity factor refers to severity factor information of an influence caused by a specific event. The unverified information refers to a message comprising information whose source has not been identified.

The POI-event container 920*a* of the POI message 900*a* comprises status information or event information. Description of the status information complies with a hierarchical structure, which is for the purpose of guaranteeing the compatibility of a terminal according to specification extension and component addition.

The highest class defined in the POI event container 920*a* is comprised of five basic components and three additional components (option) by taking the complexity of a terminal implementation and the distinction of information providing into consideration. Addition of a further class or extension of a lower class is possible by adding only component identifiers.

The five basic components comprise a POI classification component, a POI description component, a bi-direction service component, a time information component, and a parking information component.

The POI classification component refers to a large classification (ex: destinations, good restaurants, leisure/tourism, lodging, restaurants, hospitals, banking facilities, public institutions, etc.), and a bearer classification (ex: golf courses, theme parks, mountains, racecourses, zoos, Korean restaurants, Chinese restaurants, Japanese restaurants, hotels, motels, etc.).

The POI description component comprises photograph information related to text type description of POI (addresses, menus, news, telephone numbers, web sites, description, information, names, titles, time tables, urgent messages, reservation information, maps, outline maps, and so on).

The bi-direction service component comprises addresses and telephone numbers of contact points of POI for bi-direction communication. The time information component comprises time information related to PO (ex: a time type, a service date or day, a time table, etc.). The parking information component comprises parking information related to POI (a parking lot type, price (basic fee, exceeding time of basic fee, fee upon exceeding time, etc.).

The three additional components comprise a feature information component, a product information component, and a relation information component.

The feature information component comprises feature information related to POI (feature description and its related photographs, accommodation information of facilities, atmosphere information, preference information, main age information, reservation information, convenience information, service information (smoking or not), evaluation information, payment information, opening day/closing day information, holiday information, etc.).

The product information component comprises product information related to PO (product names, price, peculiar information and its related photographs, performance product information, etc.). The relation information component comprises surrounding POI information, description, etc., which are related to a main POI.

The TPEG-location container 930*a* of the POI message 900*a* comprises location information about POI.

Meanwhile, object information comprised in a multimedia object information container 920*b* of a multimedia based traffic and travel information message 900*b* shown in FIG. 9 comprises multimedia object information about detailed information of POI comprised in the POI-event container 920*a*.

In the present embodiment, the information for appropriated applications, which contains information about whether a delivered object contains information about which application, will correspond to a POI service application.

In addition, the multimedia based traffic and travel information message of FIG. 9 is identical to that of FIG. 4, and detailed description thereof is omitted.

Figure 10:
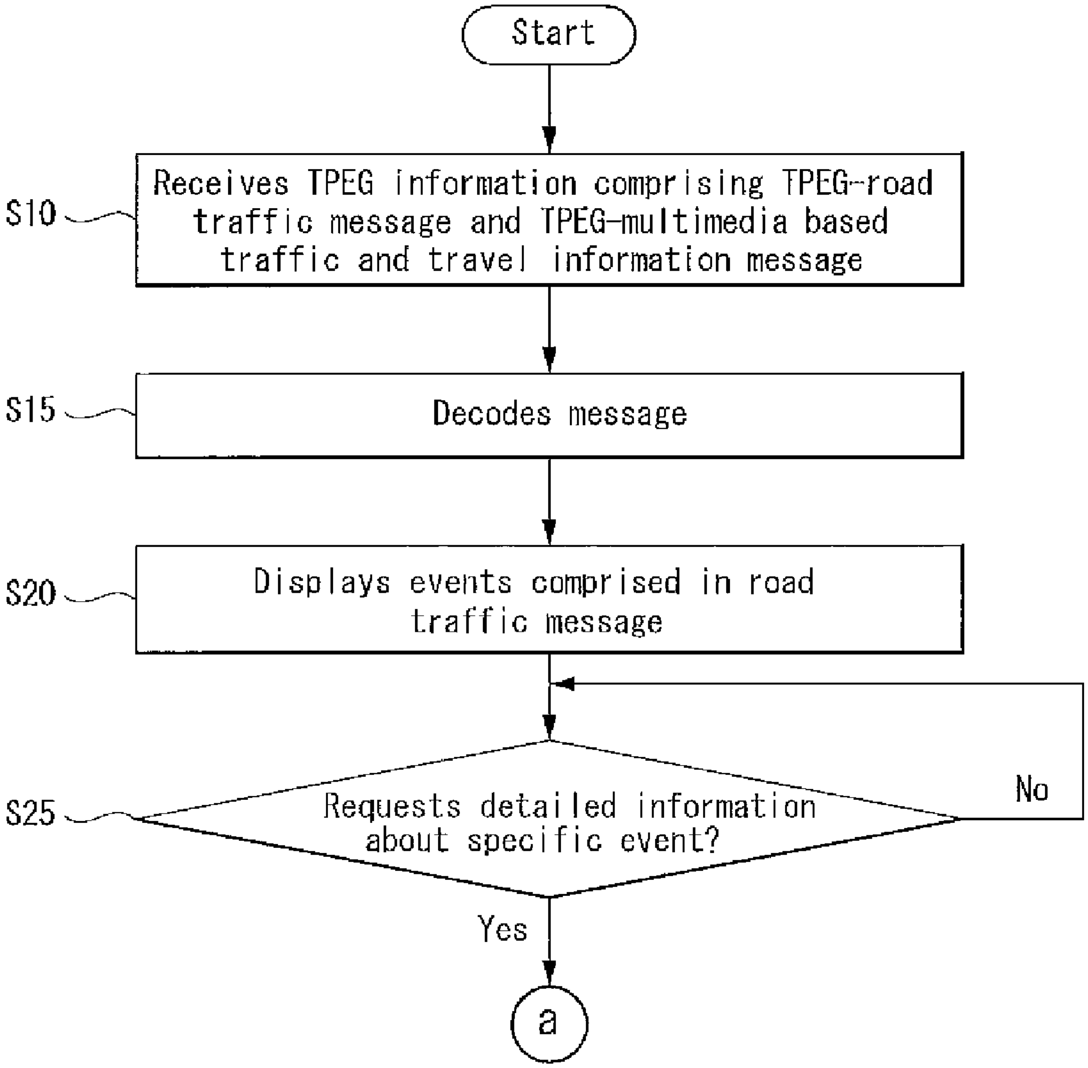
FIGS. 10 to 12 are flowcharts provided to describe a method of providing detailed information using a TPEG-multimedia based traffic and travel information application in accordance with an embodiment of this document.
Figure 11:
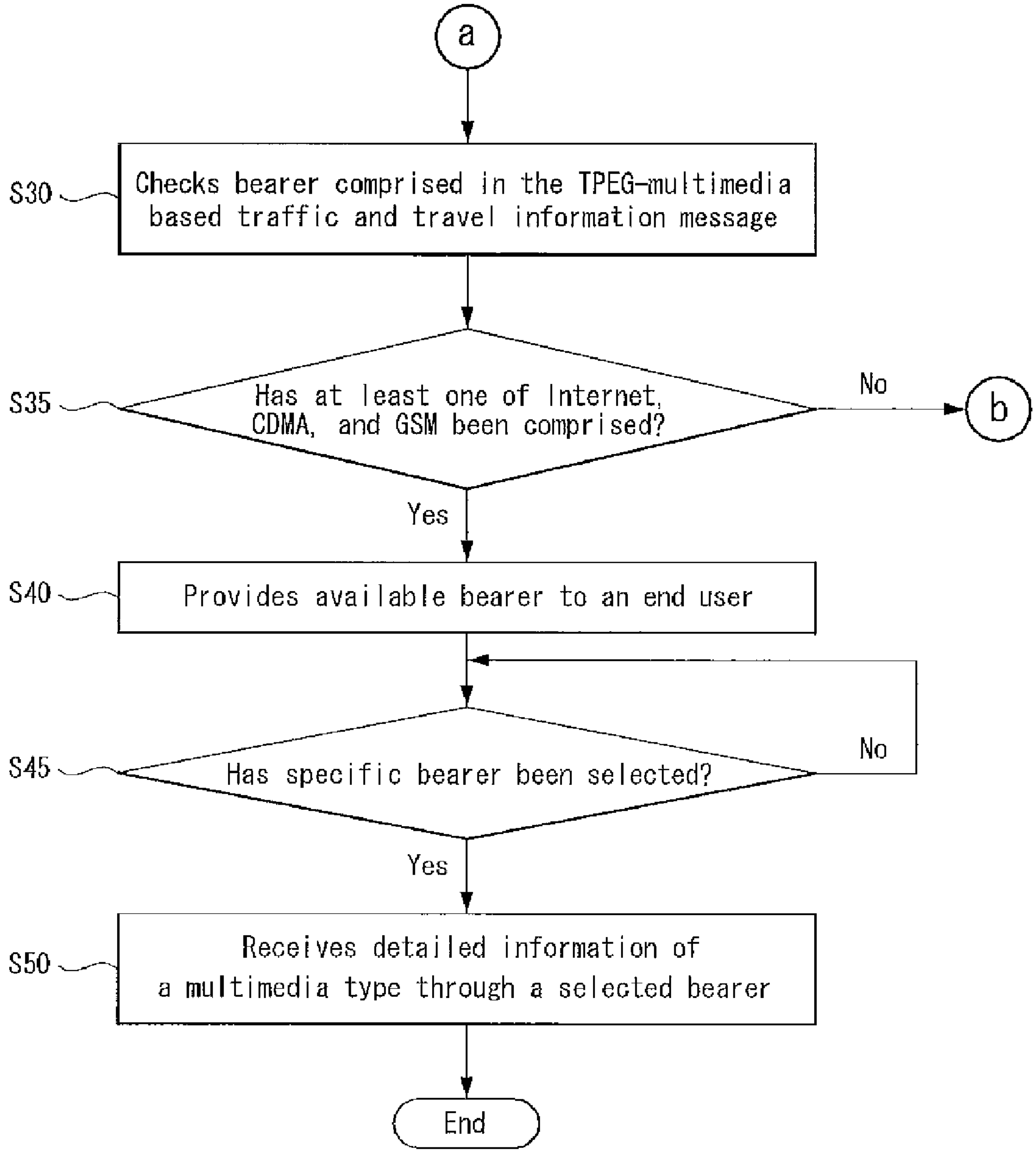
Figure 12:
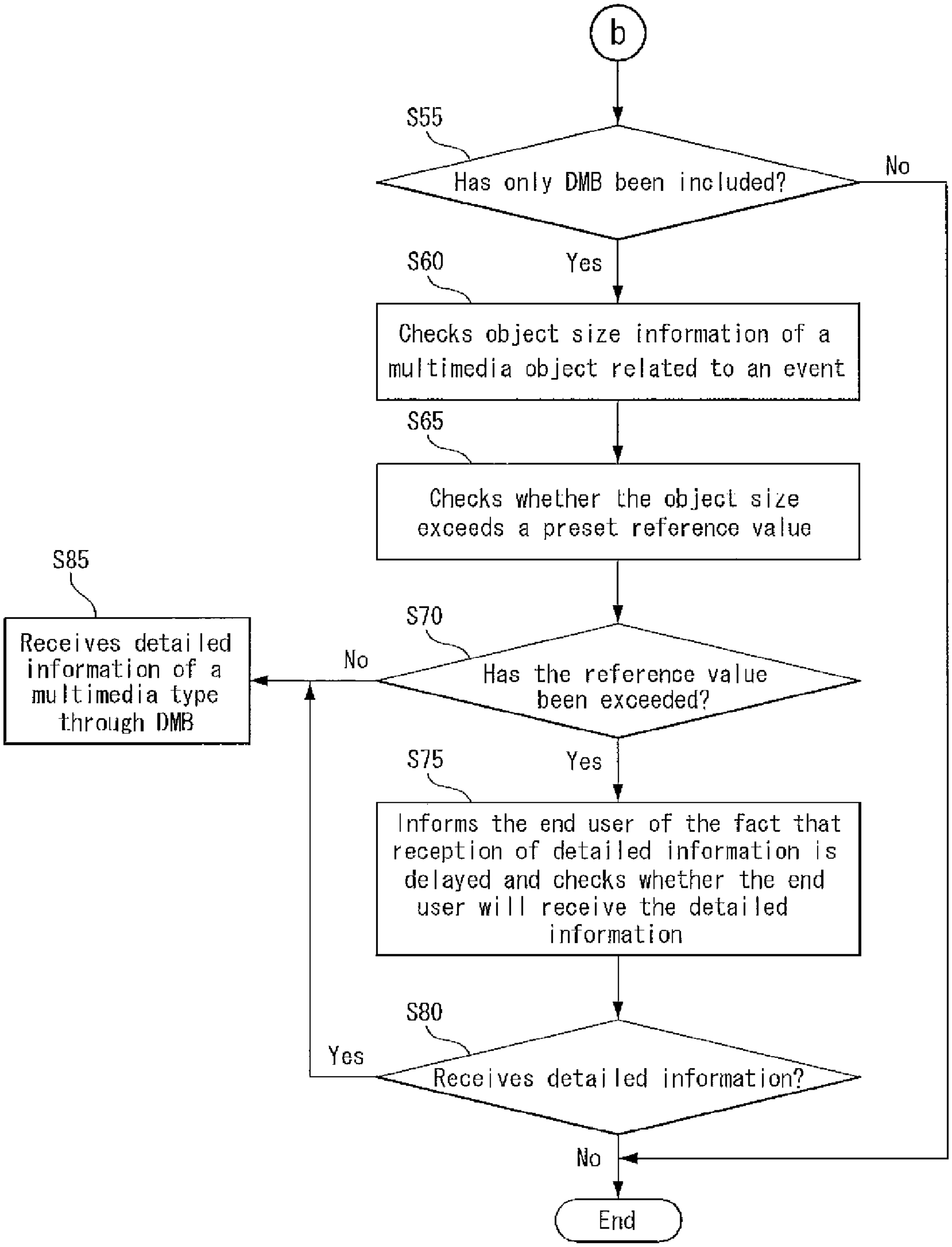

FIGS. 10 to 12 are flowcharts provided to describe a method of providing detailed information using a TPEG-multimedia based traffic and travel information application in accordance with an embodiment of this document.

Referring to FIG. 10, the terminal 100 receives TPEG information, comprising the TPEG-road traffic message application and the TPEG-multimedia based traffic and travel information application as shown in FIG. 4 [S10]. Here, the TPEG information is comprised in a broadcasting signal and transmitted from the broadcasting station 15 as described above.

The TPEG decoder 120 of the terminal 100 decodes TPEG messages (i.e., a road traffic message and a multimedia based traffic and travel information message) comprised in the received TPEG information and provides the decoded TPEG messages to the processor 140 [S15].

The processor 140 displays an event, comprised in the decoded road traffic message, on the display 160 or outputs the event in a voice advice file form through the voice output unit 180 under the control of the controller 130 so that an end user can recognize an event such as an accident [S20]. Here, the processor 140 may be implemented to display an event only when a point where the event has occurred is within a certain radius of a current location of the vehicle 20.

Figure 13:
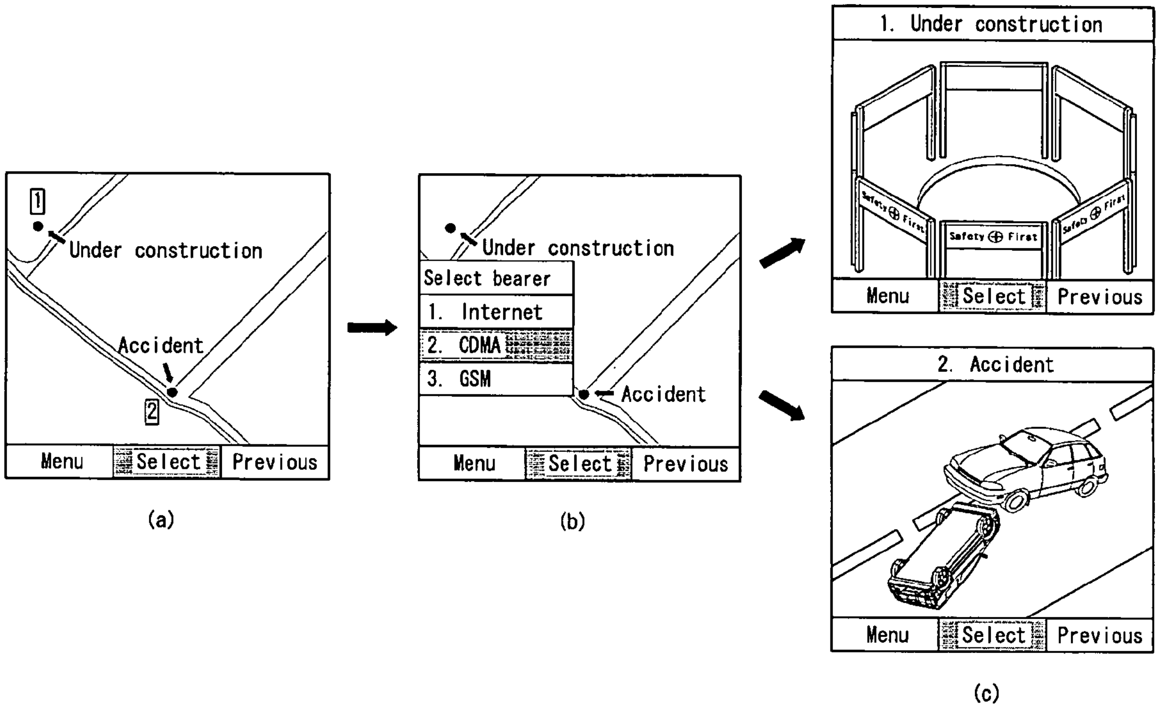
FIG. 13 shows an example of a screen displaying events included in a road traffic message and detailed information thereof.

FIG. 13 shows an example of a screen displaying events included in a road traffic message and detailed information thereof.

The events defined in the TPEG-road traffic message application are described in the above table 1. In (a) of FIG. 13, events refer to No. 1 under construction and No. 2 accident. In the state in which events comprised in a road traffic message are displayed on the display 160 as described above, if an end user requests detailed information about a specific event [S25], the controller 130 checks bearer information comprised in the decoded multimedia based traffic and travel information message [S30 of FIG. 11].

Referring to FIG. 11, in the case in which available bearer information comprises at least one of Internet, CDMA, and GSM (i.e., telecommunication networks) [S35: Y], the controller 130 controls the processor 140 to output the bearer information to the display 160 or the voice output unit 180 and controls a bearer information select menu to be displayed so that an end user can select any one piece of bearer information [S40].

In the case in which the end user has selected specific bearer information [S45: Y], the controller 130 controls the communication module 190 to request multimedia type detailed information, which is related to an event, from the multimedia data providing server 30 through the selected bearer information and receives multimedia type detailed information, which is related to the event, from the multimedia data providing server 30 [S50].

Meanwhile, in the case in which the available bearer information does not comprise all the Internet, CDMA, and GSM, but comprises only DMB in step S35 [S55: Y], the controller 130 checks object size information of a multimedia object related to the event [S60] and checks whether the object size exceeds a preset reference value [S65].

In the case in which the object size does not exceed the preset reference value [S70: No], the controller 130 can control detailed information of a multimedia type to be received through DMB (i.e., a broadcasting network).

In the case in which the object size exceeds the preset reference value [S70: Y], that is, when the data amount of detailed information is great, the controller 130 controls the processor 140 to notify the end user of the fact that reception of the detailed information related to the event is delayed and checks whether to perform reception of the detailed information [S75].

More specifically, the processor 140 can output a guidance sentence "Reception of the detailed information is delayed. May I receive the detailed information?" to the display 160 in a text form or the guidance sentence through the voice output unit 130 through voice under the control of the controller 130.

In the case in which the end user has selected reception of the detailed information [S80], the end user can receive the multimedia type detailed information through DMB (i.e., a broadcasting network) [S85]. However, data reception through DMB may be delayed as compared with a case where bearer information, such as Internet, CDMA, and GSM (i.e., telecommunication networks), is used. This is because DMB is not suitable to transmit a large capacity of data, such as multimedia data, at high speed.

In the above embodiment, it has been described that, when available bearer information does not comprise all Internet, CDMA, and GSM, but comprises only DMB, different control is performed according to the data amount of detailed information. However, the present embodiment is not limited thereto.

In other words, when available bearer information comprises only DMB, the processor 140 can display a guidance sentence "It is in a state where detailed information is not received" on the display 160 under the control of the controller 130. At this time, the controller 130 can control the reception of the detailed information to be finished.

Figure 14:
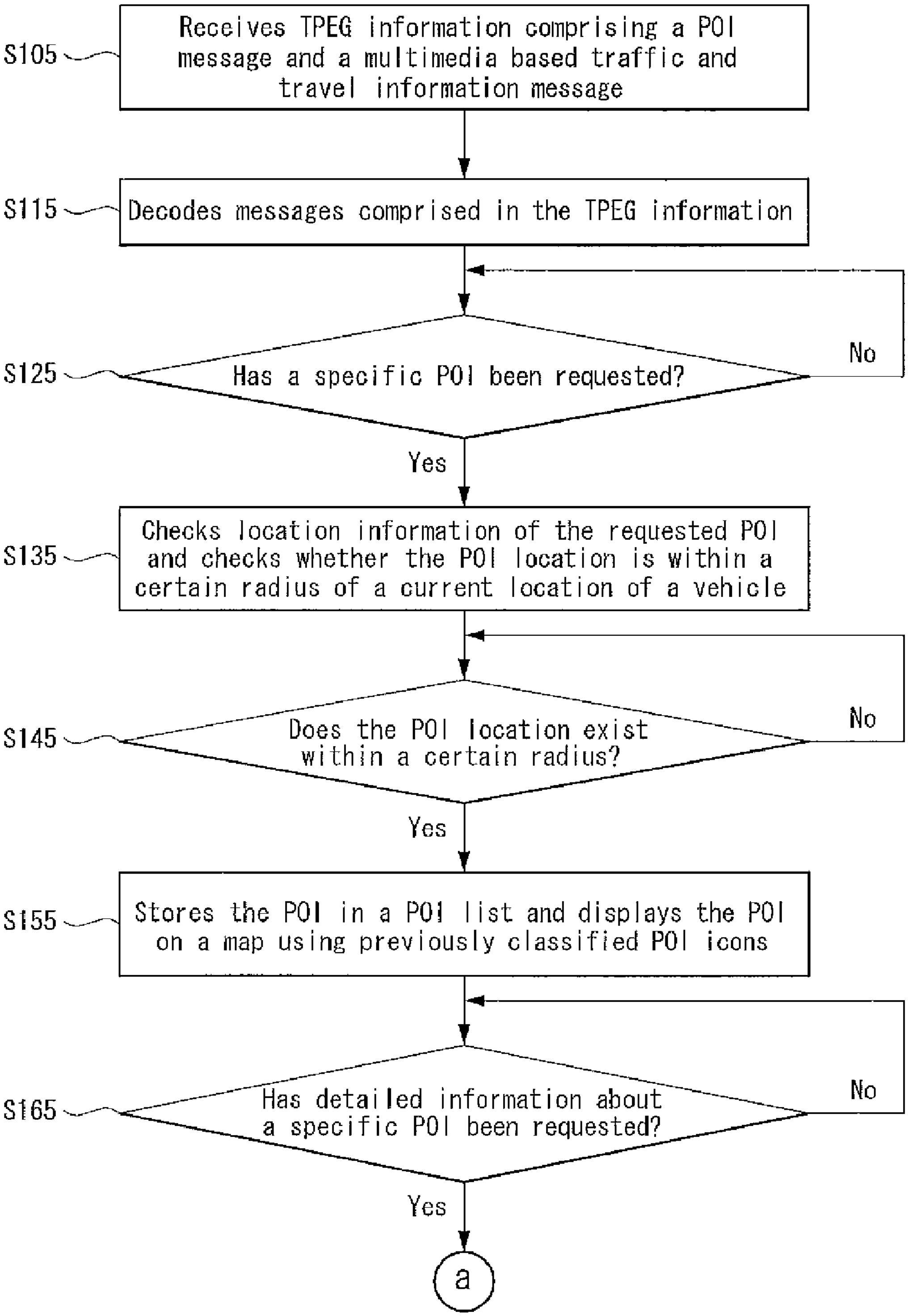
FIG. 14 is a flowchart provided to describe a method of providing detailed information using a TPEG-multimedia based traffic and travel information application in accordance with another embodiment of this document.

FIG. 14 is a flowchart provided to describe a method of providing detailed information using a TPEG multimedia based traffic and travel information application in accordance with another embodiment of this document.

Referring to FIG. 14, the broadcasting signal receiver 110 receives TPEG information, comprising a POI message and a multimedia based traffic and travel information message, and provides the TPEG information to the TPEG decoder 120 [S105].

The TPEG decoder 120 decodes messages (i.e., the POI message and the multimedia based traffic and travel information message) comprised in the TPEG information and provides the decoded messages to the controller 130 [S115].

In the case in which a specific POI (for example, food restaurant information) has been requested by an end user [S125], the controller 130 checks location information of the requested POI with reference to the TPEG-location container 930*a* of the POI message 900*a* and checks whether the POI location is within a certain radius of a current location of the vehicle 20 [S135].

In the case in which the requested POI location is within a certain radius of the current location of the vehicle 20 [S145], the controller 130 stores the corresponding POI in a POI list within the memory 150 and controls the processor 140 to display POI icons, which have been previously classified, on a map of a screen [S155].

In the case in which an end user requests detailed information about a specific POI [S160], the same process as that of FIG. 11 is executed. The end user can request detailed information about a specific POI by touching the POI icons displayed on the screen or using the input unit 170.

Hereinafter, a method of receiving detailed information about a specific POI in the case in which the detailed information is requested is described with reference to FIGS. 11 and 15.

Figure 15:
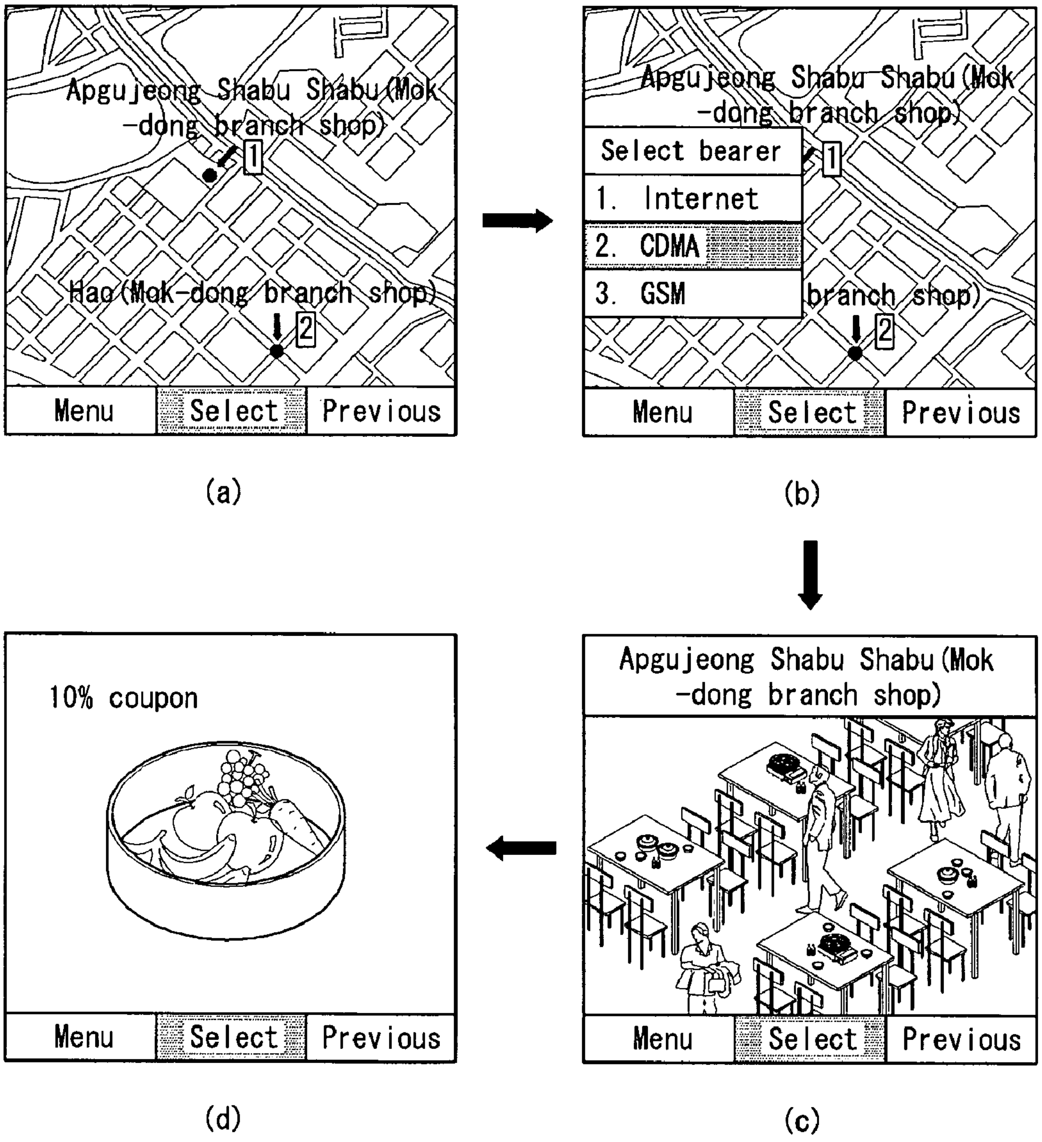
FIG. 15 shows an example of a screen displaying POIs, which exist within a specific radius of a vehicle, and detailed information thereof.

FIG. 15 shows an example of a screen displaying POIs, which exist within a specific radius of a vehicle, and detailed information thereof.

Referring to (a) of FIG. 15, information about food restaurants (i.e., POI), which exists within a certain radius of a current location of the vehicle 20, is displayed at the request of POI (ex: restaurant) by an end user.

If the end user requests detailed information about No. 1 restaurant "Apgujeong Shabu Shabu (Mok-dong branch shop)", a menu for selecting specific bearer information is displayed as shown in (b) of FIG. 15. The bearer information refers to a telecommunication network used to receive detailed information.

For example, in the case in which available bearer information comprises Internet, CDMA, and GSM, if the end user selects CDMA, the controller 130 controls the communication module to request detailed information from the multimedia data providing server 30 using a COMA scheme.

The communication module 190 of the terminal 100 receives multimedia type detailed information from the multimedia data providing server 30 over the CDMA network and provides the received detailed information to the processor 140. The processor 140 can perform signal processing on the detailed information and display the results on the display 160 under the control of the controller 130.

(c) of FIG. 15 shows a slide image of "Apgujeong Shabu Shabu (Mok-dong branch shop)". If the end user presses selection in the state in which (c) of FIG. 15 is displayed on the screen, a discount coupon of "Apgujeong Shabu Shabu (Mok-dong branch shop)" is displayed.

As described above, according to the embodiments, detailed information of events related to road traffic or detailed information of a multimedia type about a specific POI can be received using a multimedia based traffic and travel information message.

In the above embodiments, TPEG information comprising a TPEG road traffic message application and a multimedia based traffic and travel information message application has been described as one embodiment, and TPEG information comprising a POI service application and a multimedia based traffic and travel information message application has been described as another embodiment.

However, it is to be understood that this document can be applied to a case where TPEG information comprises all the TPEG-road traffic message application, the POI service application, and the multimedia based traffic and travel information message application.

In accordance with the present embodiment, there is an advantage in that detailed information of a multimedia type about POIs or events acquired through TPEG information can be received.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A computer based method of processing multimedia based traffic and travel information, the method performed by an electronic device and comprising:

receiving transport protocol expert group (TPEG) information having a hierarchical structure and including a first and second message, the first message being one of a road traffic message about an event and a point of interest (POI) message about a POI, and the second message being a corresponding one of a multimedia-based traffic and travel information message about the event and a multimedia-based traffic and travel information message about the POI;

displaying on a display a corresponding one of the event and the POI based on information in the first message;

receiving a user request for detailed information related to the one of the event and the POI;

determining at least one of an available telecommunication network and an available wireless communication network;

displaying a list based on the determined at least one of the available telecommunication network and the available wireless communication network;

receiving a user selection of a bearer from the list;

determining, based on bearer information of the determined at least one of the available telecommunication network and the available wireless communication network, whether a size of the detailed information is smaller than a threshold value;

receiving the detailed information related to the one of the event and the POI from a multimedia data providing server via the selected bearer according to whether or not the size of the detailed information is smaller than the threshold value; and displaying the received detailed information, wherein the bearer information is included in the second message so that the multimedia data providing server is connectable through the determined at least one of the available telecommunication network and the available wireless communication network for receiving the detailed information related to the one of the event and the POI.

2. The method of claim 1, wherein:

the detailed information includes a multimedia object comprising at least one of an audio object, a video object, and an image object, and the second message includes attribute information of the multimedia object.

3. The method of claim 2, wherein the attribute information comprises one of object information, application information, the bearer information and additional text information.

4. The method of claim 3, wherein the object information comprises one of an object play type, an object type, an object format, an object size and object compression information.

5. The method of claim 3, wherein the application information describes that the multimedia object comprises an object associated with a TPEG-road traffic message application and includes one of an application type, an application description and billing information.

6. The method of claim 1, wherein:

the list comprises at least one of an Internet bearer, a global system for mobile (GSM) bearer, and a code division multiple access (CDMA) bearer.

7. The method of claim 1, wherein:

the first message comprises at least one of a message management container, a road traffic message (RTM) container and a TPEG-location container, and the second message comprises at least one of a message management container, a multimedia object information container and a TPEG-location container.

8. The method of claim 1, wherein:

the detailed information includes a multimedia object comprising at least one of an audio object, a video object, and an image object, and the second message includes attribute information of the multimedia object.

9. The method of claim 8, wherein the attribute information comprises one of object information, application information, the bearer information and additional text information.

10. The method of claim 9, wherein the object information comprises one of an object play type, an object type, an object format, an object size and object compression information, the object size used in the size evaluation.

11. The method of claim 9, wherein the application information describes that the multimedia object comprises an object associated with a TPEG-road traffic message application and includes one of an application type, an application description and billing information.

12. A method for receiving data by an electronic device, the method comprising:

determining, by the electronic device, whether a size of a data to be downloaded is greater than a threshold value;

determining, by the electronic device, at least one of a telecommunication network and a wireless communication network with respect to the size of the data; and receiving, by the electronic device, the data via the determined at least one of the telecommunication network and the wireless communication network.

13. The method of claim 12, further comprising:

displaying a list of the determined at least one of the telecommunication network and the wireless communication network.

14. The method of claim 12, wherein the step of determining whether the size of the data to be downloaded is greater than the threshold value comprises:

displaying an alert that the size of the data is greater than the threshold value.

15. The method of claim 12, wherein the data corresponds to a multimedia object comprising at least one of an audio object, a video object, and an image object.

16. The method of claim 12, wherein the data includes application information.

17. The method of claim 11, wherein the telecommunication network includes at least one of an wireless Internet network, a global system for mobile (GSM) network, and a code division multiple access (CDMA) network.

18. A terminal device configured to process multimedia based traffic and travel information, the terminal device comprising:

a receiver;

a display; and a controller operatively connected to the receiver and the display, the controller configured to determine whether a size of a data to be downloaded is greater than a threshold value, determine at least one of a telecommunication network and a wireless communication network with respect to the size, and receive the data via the determined at least one of the telecommunication network and the wireless communication network.

19. The terminal device of claim 18, wherein the data corresponds to a multimedia object comprising at least one of an audio object, a video object, and an image object.

20. The terminal device of claim 18, wherein the controller is configured to display an alert that the size of the data is greater than the threshold value.

21. The terminal device of claim 18, wherein the controller is configured to provide information to a user about a network reception limitation or a network capability relative to the size of the data.

22. The method of claim 12, wherein the step of determining the at least one of the telecommunication network and the wireless communication network with respect to the size comprises:

providing information to a user about a network reception limitation or a network capability relative to the size of the data.

* * * * *